(12) United States Patent
O'Sullivan

(10) Patent No.: US 7,538,318 B2
(45) Date of Patent: May 26, 2009

(54) CONDENSATION-INDUCED GAMMA RADIATION AS A METHOD FOR THE IDENTIFICATION OF CONDENSABLE VAPOR

(75) Inventor: Terence P. O'Sullivan, Bakersfield, CA (US)

(73) Assignee: Aera Energy LLC, Bakersfield, CA (US)

( * ) Notice: Subject to any disclaimer, the term of this patent is extended or adjusted under 35 U.S.C. 154(b) by 0 days.

(21) Appl. No.: 12/038,726

(22) Filed: Feb. 27, 2008

(65) Prior Publication Data
US 2008/0217523 A1 Sep. 11, 2008

Related U.S. Application Data

(60) Provisional application No. 60/892,197, filed on Feb. 28, 2007.

(51) Int. Cl.
G01V 5/04 (2006.01)
(52) U.S. Cl. .................... 250/256; 250/261
(58) Field of Classification Search ........... 250/256, 250/261
See application file for complete search history.

(56) References Cited

U.S. PATENT DOCUMENTS

| 2,740,051 | A |   | 3/1956  | Scherbatskoy |              |
|-----------|---|---|---------|--------------|--------------|
| 2,906,882 | A |   | 9/1959  | Merrit       |              |
| 3,435,629 | A | * | 4/1969  | Hallenburg   | ... 62/259.1 |
| 4,221,482 | A |   | 9/1980  | Macourt      |              |
| 4,315,417 | A |   | 2/1982  | Zarudiansky  |              |
| 4,426,581 | A | * | 1/1984  | Kreiner et al. | ... 250/380 |
| 4,779,000 | A | * | 10/1988 | Ing          | ... 250/390.03 |
| 5,909,772 | A | * | 6/1999  | Merkel et al. | ... 166/250.16 |
| 2002/0070337 | A1 | * | 6/2002 | Fitzgerald | ... 250/256 |
| 2003/0201098 | A1 |   | 10/2003 | Karanikas |              |
| 2004/0020642 | A1 | * | 2/2004 | Vinegar et al. | ... 166/245 |

OTHER PUBLICATIONS

International Search Report for corresponding PCT application PCT/US08/55169 lists the references above.

* cited by examiner

Primary Examiner—David P. Porta
Assistant Examiner—Jessica L Eley
(74) Attorney, Agent, or Firm—Hogan & Hartson LLP

(57) ABSTRACT

In methods according to the invention, subsurface formations below the surface of the earth are detected by introducing a condensable material in vapor form into the subsurface formation, measuring radiation of the condensable material, increasing the concentration of the condensable material through condensation, measuring radiation of the condensable material of increased concentration, and comparing the radiation of the condensable material of increased concentration to the radiation of the condensable material in vapor form to identity the presence of the condensable material. In a practical example employing methods according to the invention, gamma radiation in the well is logged to define a background radiation response, the well is chilled by pumping cool water into it to cause steam surrounding the well to form condensate, gamma radiation in the well is logged to define a new radiation response, and the new radiation response is compared to the background radiation response to identity vapors where the radiation increased.

9 Claims, 15 Drawing Sheets
(12 of 15 Drawing Sheet(s) Filed in Color)

Fig. 3-9—Potassium, thorium, and uranium response curves (NaI crystal detector).

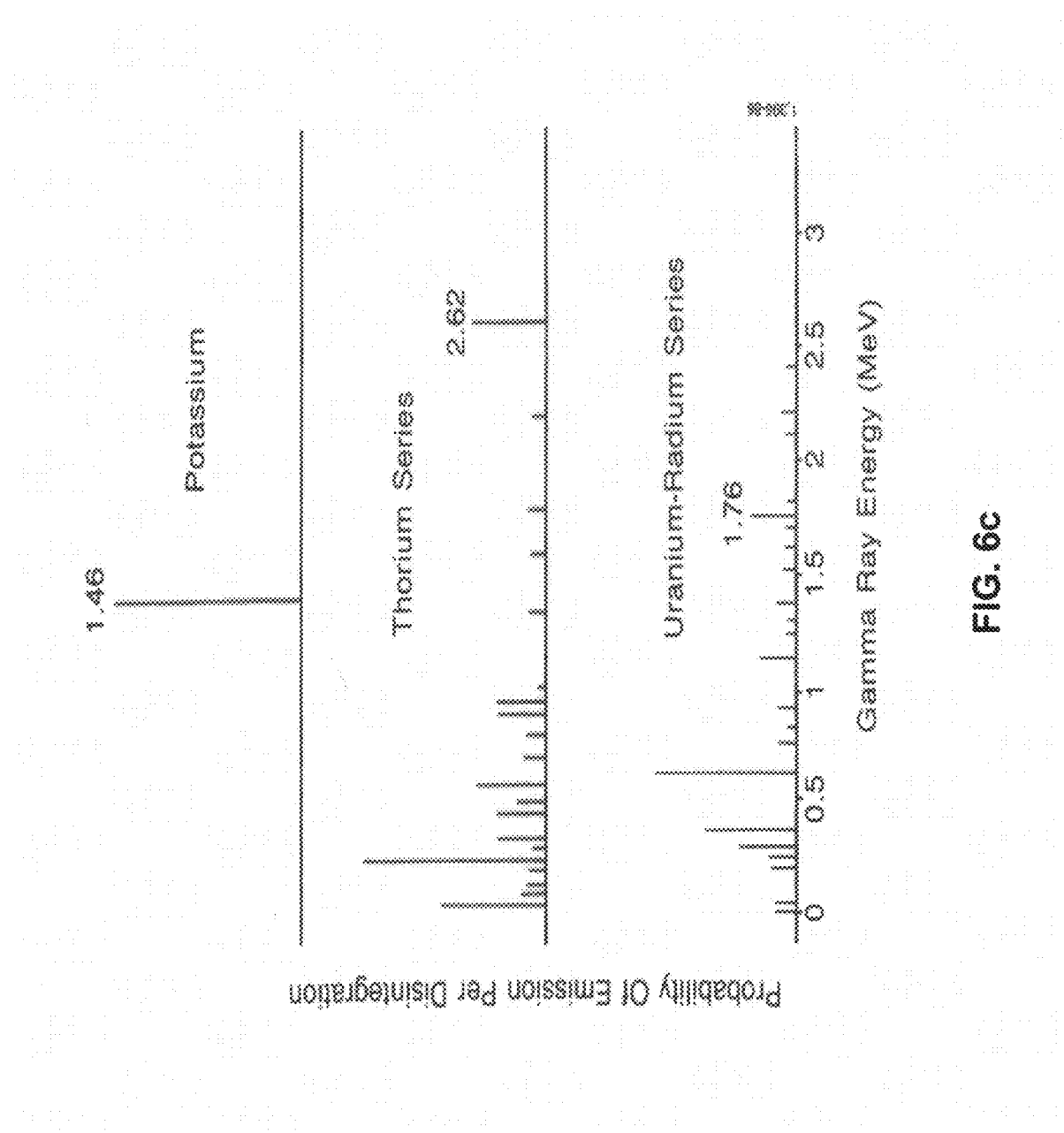

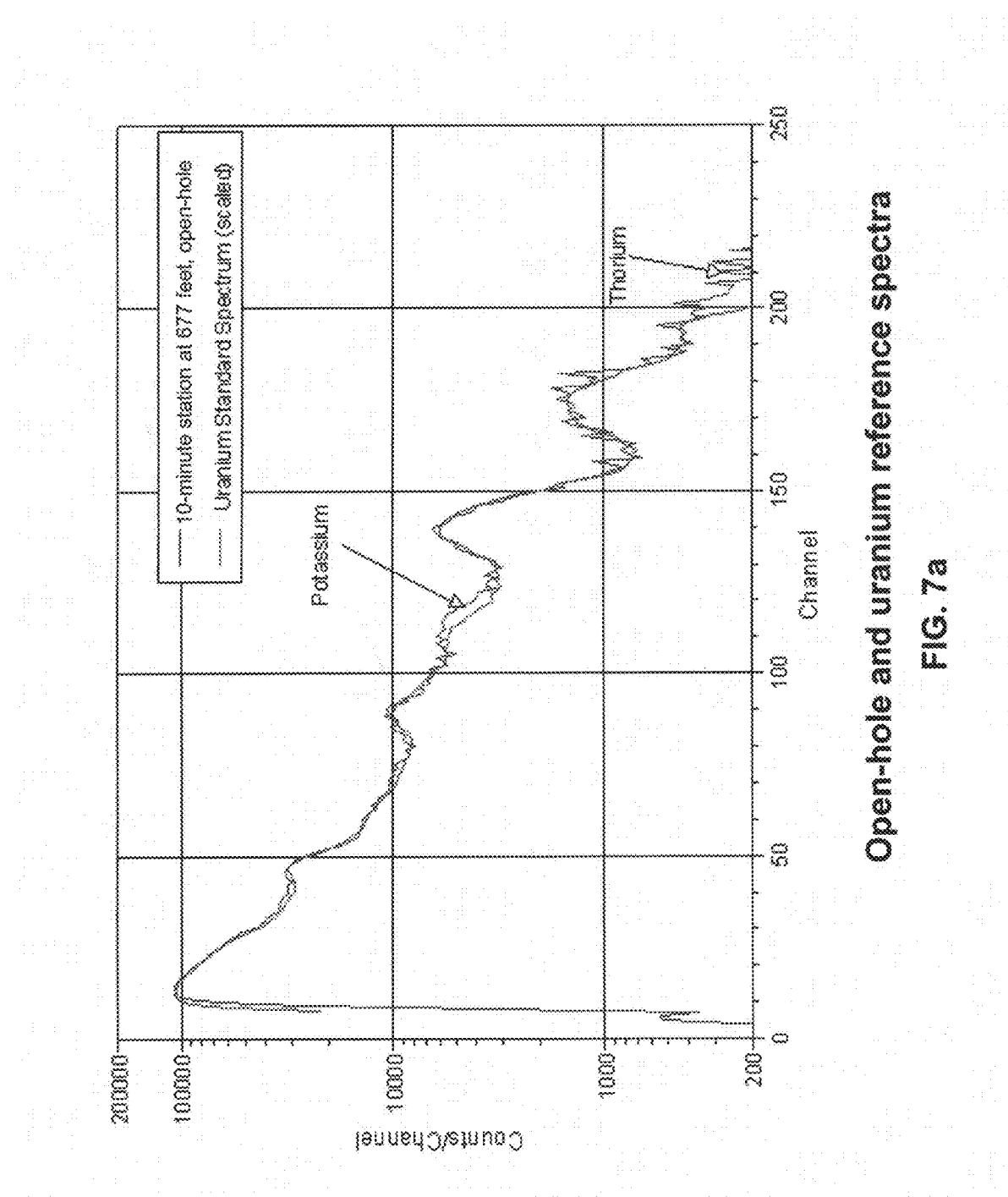

Open- and Cased-Hole Spectra

CONDENSATION-INDUCED GAMMA RADIATION AS A METHOD FOR THE IDENTIFICATION OF CONDENSABLE VAPOR

CROSS-REFERENCE TO RELATED APPLICATION

The present application claims priority to U.S. Provisional Patent Application Ser. No. 60/892,197, filed Feb. 28, 2007.

BACKGROUND OF THE INVENTION

1. Field of the Invention

The present invention relates to methods for condensing vapor to concentrate naturally-occurring radiation, and to identify and characterize steam and condensable gases in subsurface formations in the ground by observing the increased radiation.

2. History of the Prior Art

In the drilling and operation of oil wells, large amounts of natural gas are used to make steam which reduces the viscosity of the oil. Because of the cost of the natural gas consumed, it is desirable to optimize the placement of steam within the well and observation of the manner in which the steam moves through reservoirs under the ground.

It is extremely difficult, given present technology, to accurately evaluate oil recovery and steam placement from producing oil wells. For this reason, it is common practice to drill observation wells relatively close to the producing wells. The observation wells are not used to produce any oil but rather to evaluate conditions close to the producing wells so that oil recovery and steam placement can be predicted for the adjacent producing wells. The problem is that the conditions belowground can vary considerably between the observation wells and the producing wells even though they may be relatively close to each other. In a heterogeneous belowground reservoir, conditions at the nearby producing well may differ significantly from those at an observation well. At the same time, it is very difficult to accurately evaluate oil recovery and steam placement from the producing wells.

When steam is injected into a well, it accumulates in the underground reservoirs within the well where the oil is located. Consequently, detection of the steam within the well identifies the locations of the oil deposits. Steam and other condensable gases produce detectable radiation because they are carriers of radon gas. Such gamma radiation is detected to identify the location of the steam.

U.S. Pat. No. 2,197,453 of Hassler provides examples of technologies used in the oil industry in which radioactive gaseous emanation (radon) is measured by a gamma detector. Further examples are provided by U.S. Pat. No. 2,385,378 of Piety. The Piety patent is exemplary of technologies in the industry in which the radioactive radon is artificially added.

Russian Patent RU2079650 C1 of Filippov describes the surveying of production reservoirs perforated by cased and uncased holes. The patent describes detection of water-saturated and oil-saturated seams in a perforated reservoir, and involves determination of depth of penetration of a radioactive radon-containing indicator liquid and the degree of change in time of gamma radiation activity in seams.

Still other arrangements which utilize the detection or measurement of the radiation of radon include U.S. Pat. No. 4,221,482 of Macourt which carries out mineral prospecting by detection of radon or iodine, U.S. Pat. No. 4,495,142 of Nakayama which describes a system for monitoring the state of a nuclear reactor core, and U.S. Pat. No. 5,501,099 of Whorff which describes a vapor density measurement system.

Because the data provided by observation wells is of limited accuracy, it would be desirable to be able to optimize the placement and observation of steam in the producing wells themselves. However, this is very difficult to do inasmuch as these wells are typically large-diameter wells, with air-liquid or steam-liquid contacts within a completed interval therein. Modern thermal and epithermal neutron tools for logging to identify steam do not have the depth of investigation to work well. Such tools are designed to make observations from liquid-filled wells.

Accordingly, the need exists to provide methods whereby the location of steam within a producing well can be accurately determined.

BRIEF DESCRIPTION OF THE INVENTION

In accordance with the invention, a formation in the ground is evaluated by measuring a property of the formation, causing condensation to occur in the formation, measuring change in the property as a result of condensation occurring in the formation, and evaluating the property of the formation based on the measured change therein. Preferably, the property of the formation is radioactivity and the step of measuring the property comprises measuring gamma radiation in the formation. The formation may be a subsurface formation adjacent an oil well in the ground. The step of measuring a property may comprise measuring gamma radiation of the formation following filling the formation with vapor (primarily steam), the step of causing condensation comprises condensing the vapor, and the step of measuring change in the property comprises measuring change in gamma radiation of the formation as a result of condensing the vapor. The step of causing condensation may comprise introducing cold water into the oil well.

In carrying out methods according to the invention in the case of an oil well, steam is pumped into the formation, following which gamma radiation in the well is logged to define a background radiation response. The well is then chilled by pumping cool water therein, to cause the steam and vapor surrounding the well to form condensate. The gamma radiation in the well is then logged to define a new radiation response, which is compared with the background radiation response to identify steam zones.

Thus, methods according to the invention employ introduction of a condensable material in vapor form into a subsurface formation, measuring radiation of the condensable material, increasing the concentration of the condensable material through condensation, measuring radiation of the condensable material of increased concentration, and comparing the radiation of the condensable material of increased concentration to the radiation of the condensable material in vapor form to identify the presence of the condensable material. The steps of measuring radiation of the condensable material may comprise measuring emitted gamma radiation associated with the radioactive decay of radon.

The methods in accordance with the invention are based on the observation that when a condensable material such as steam is condensed, such as through cooling or increased pressure or both, radioactive matter contained in the material becomes concentrated, making the material much easier to detect. In the case of an oil well, condensation of the introduced vapor such as by chilling the well with cooled water greatly increases the gamma ray emission of the vapor. When this is logged and the results are compared with logging of the well before condensation of the vapor, the location of the steam and thus the oil pockets in the well are easily detected.

DESCRIPTION OF THE DRAWINGS

The file of this patent contains at least one drawing executed in color. Copies of this patent with color drawings will be provided by the Office upon request and payment of the necessary fee.

FIGS. 7a and 7b Open- and cased-hole raw natural gamma spectral (HNGS) data for 10-minute stations at 677 feet in Well "A". Open-hole station data was acquired 4 hours after circulation stopped, at a borehole temperature of 137 F. Cased-hole data was acquired 4 days later, at a borehole temperature of 220 F. "Uranium standard" shows the response to a sample of pure uranium.

DETAILED DESCRIPTION OF THE INVENTION

Methods in accordance with the invention, which are particularly useful in identifying the location of oil within producing oil wells, are the result of observation that when certain vaporous substances such as steam are condensed, the gamma radiation from such substances greatly increases in the condensed form.

Figure 1:
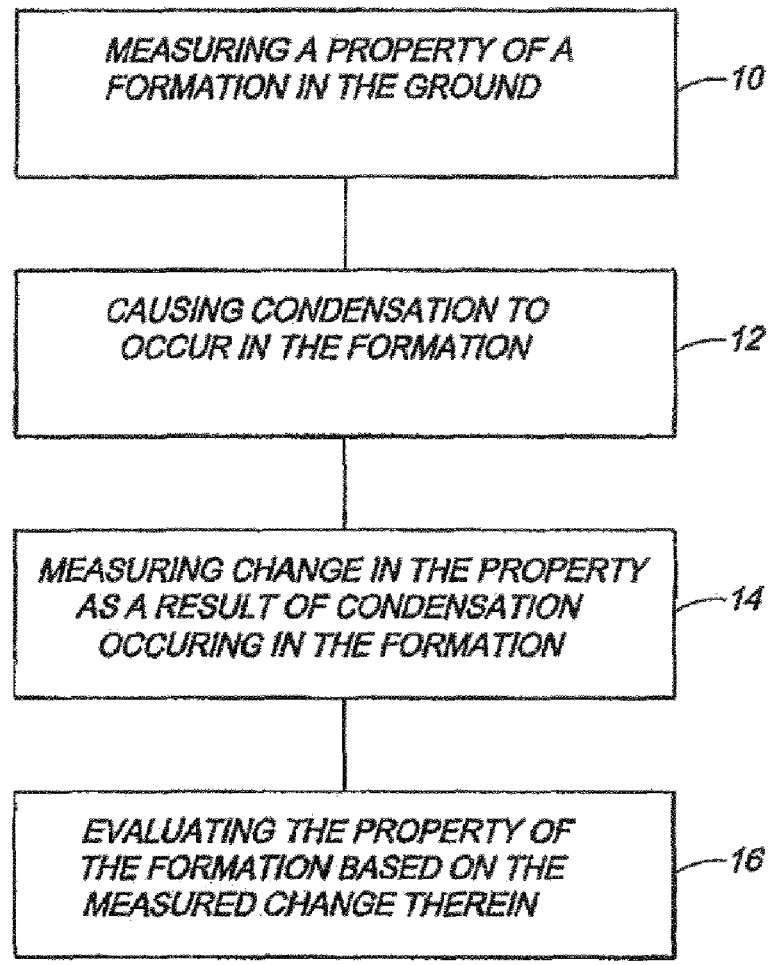
FIG. 1 is a block diagram of the successive steps of a method for measuring a property of a ground formation in accordance with the invention.

FIG. 1 illustrates the successive steps of a method in accordance with the invention for evaluating a property of a ground formation. In the first step 10, a property of a formation in the ground is measured. This provides a log or record of the formation before any condensation takes place. In a second step 12, condensation is caused to occur in the formation. In a following step 14 the change in the property as a result of condensation occurring in the formation is measured. In a following step 16, the property of the formation is evaluated based on the measured change therein. This may be accomplished by comparing the results of measuring the property of the formation in the ground in the first step 10 with the changed property as a result of condensation occurring in the formation, in the third step 14.

In the case where the measured property in the example of FIG. 1 is gamma radiation, such radiation greatly increases as the result of the condensation occurring in the formation, in the third step 14. By comparing this with the measured radiation in the first step 10, the locations of the condensable material are readily determined.

Figure 2:
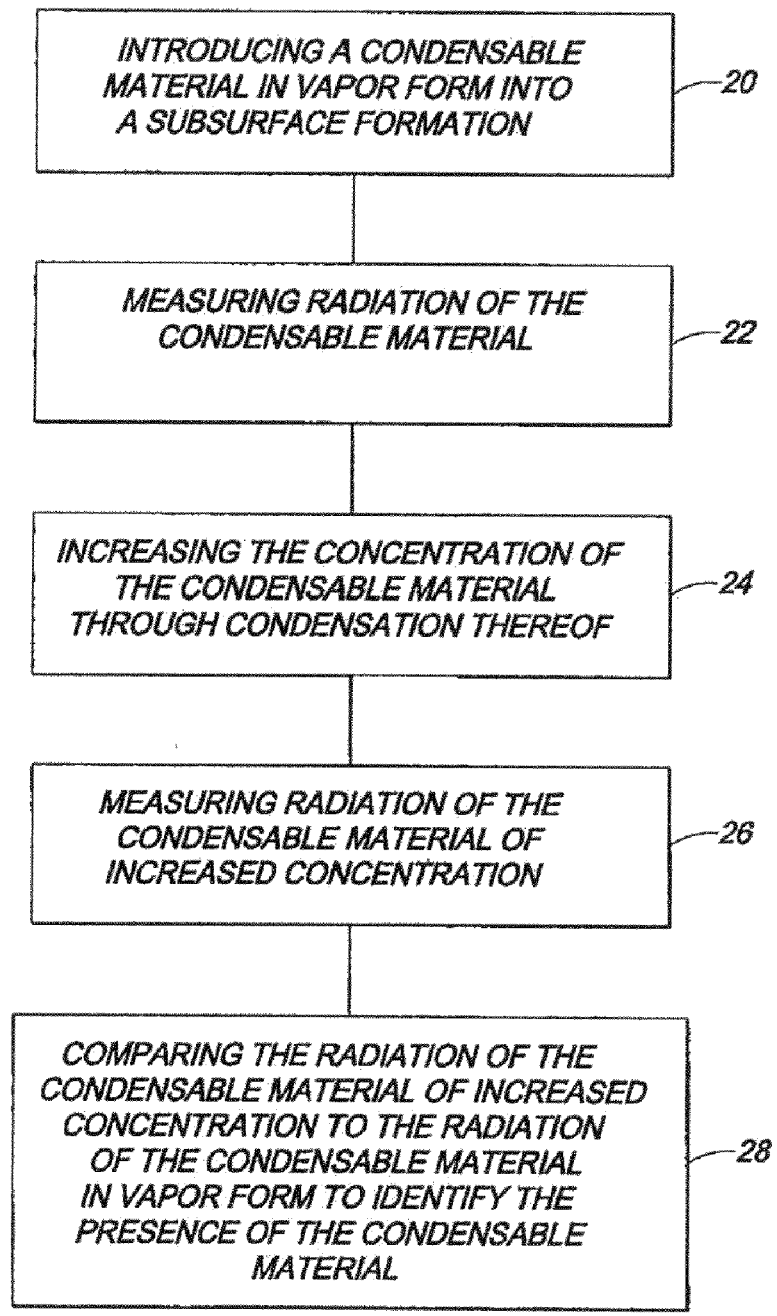
FIG. 2 is a block diagram of the successive steps of a method in accordance with the invention for identifying the presence of condensable material in subsurface formations.
Figure 3:
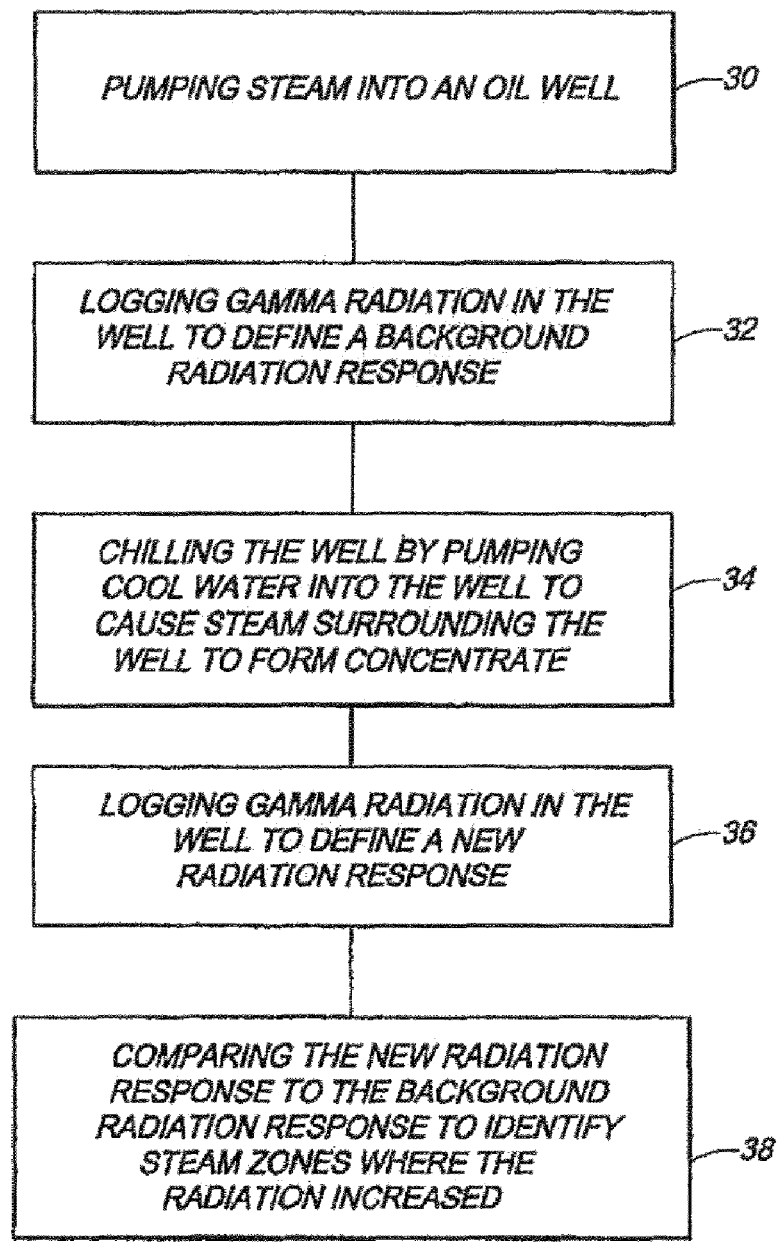
FIG. 3 is a block diagram of the successive steps of a method in accordance with the invention for identifying steam zones and thus oil deposits in an oil well.

FIG. 2 is a block diagram of the successive steps of a further method in accordance with the invention. In a first step 20 a condensable material is introduced in vapor form into a subsurface formation, such as a formation in the ground. The condensable material may comprise steam, as described in the more specific example of FIG. 3 described hereafter. In a following step 22 the radiation of the condensable material is measured. In a next step 24, the concentration of the condensable material is increased through condensation thereof. In the case of vapor as described hereinafter in the example of FIG. 3, the concentration of the steam may be increased with cooling or increased pressure or both. In a further step 26, the radiation of the condensable material of increased concentration is measured. In a final step 28, the radiation of the condensable material of increased concentration is compared with the radiation of the condensable material in vapor form, to identify the presence of the condensable material. In the example of FIG. 3 described hereafter the gamma radiation of vapor after it is condensed to increase the concentration thereof is compared with the radiation of the vapor when first introduced, and this readily identifies the presence of the vapor in underground formations.

FIG. 3 illustrates the successive steps of a further and more specific method in accordance with the invention for identifying oil deposits within an oil well using condensed steam. In a first step 30, steam is pumped into an oil well. In a second step 32, gamma radiation in the well is logged to define a background radiation response determined in stop 32. In a third step 34, the well is chilled such as by pumping cool water into the well. This causes the vapor surrounding the well to form concentrate. In a next step 36, the gamma radiation in the well is logged to define a new radiation response, and in a final step 38, this is compared with the background radiation response determined in step 32. In this manner, steam zones are identified because the gamma radiation therefrom is greatly increased due to the condensing and concentration of the vapor. The change in the gamma radiation due to condensing of the vapor is substantial when compared with the radiation of vapor which is not condensed but which is simply detected in step 32.

EXAMPLE

The following is a discussion of an example of the operation of an illustrative embodiment of the present invention, along with an explanation of the theory behind its operation.

Figure 4:
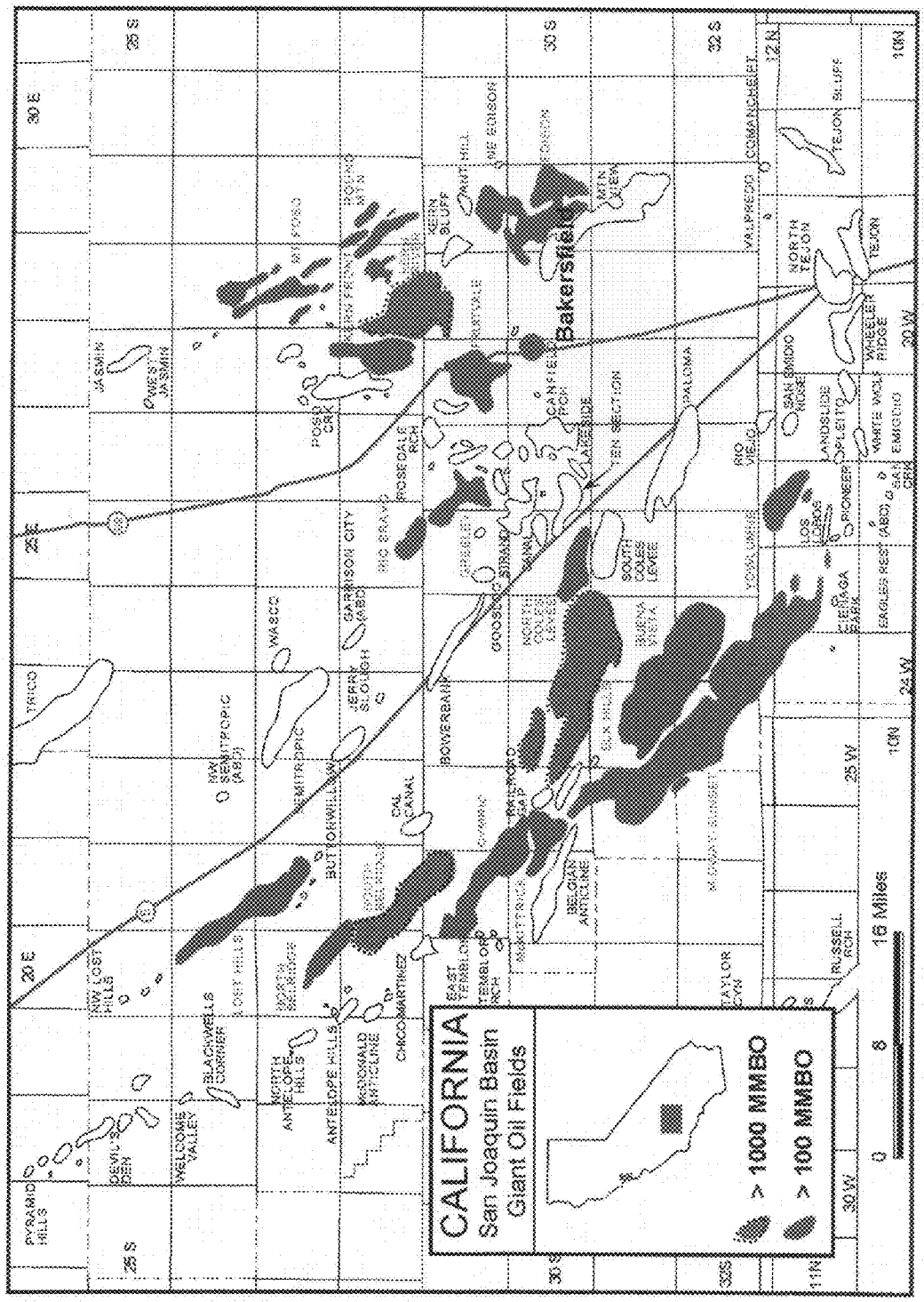
FIG. 4 is a location map for San Joaquin Basin Giant Oil fields. Four oil fields (light gray shading) have over 1 billion barrels of original oil in place. Midway-Sunset Oil Field provided the data for this study.

Midway-Sunset Field (FIG. 4) has produced almost three billion barrels of oil since 1890. The reservoir consists of massive turbidite sands, up to 600 feet thick, at depths of less than 2000 feet. Porosity and permeability for these clean sands is excellent, but the oil is heavy, with an API gravity of 12 degrees. Steam injection started in the 1960's and has significantly improved recovery. Thousands of wells have been drilled to implement the steamflood process, with inter-well spacings that are often less than 100 feet.

After years of cycle steaming and continuous injection, the steam-oil contact can be hundreds of feet below the top of the reservoir and temperatures within the steam chest can exceed 350° F. Oil zones below the steam-oil contact are heated for tens to hundreds of feet.

Evaporative mud chillers are used to safely drill in-fill or replacement wells through shallow, steam-filled reservoirs. Mud temperatures while circulating are usually less than 140° F. Open-hole logs, including mud temperature, are acquired while the well is still cool. A week or so after casing the well, cased-hole temperature is logged, often with gamma ray (GR) for depth control.

Through steam zones, temperature increases of 100-200° F. from open- to cased-hole are usually observed in new wells. For the same intervals, GR values of 1000 API in the open-hole decrease to less than 100 API in the cased-hole. GR changes of this magnitude demand attention, especially since GR logs are relied on for correlation and depth control.

The inventor is aware of two examples of high GR in the literature. One involves precipitation of naturally occurring radioactive material (NORM) as a component of scale in producing wells (Abdeen and Khalil, 1995). The other involves hazardous waste disposal sites (Ellis et al, 1995). Changes in GR, similar to those described for steam zones, have not been observed in either of these cases.

Near-wellbore cooling appears to provide the mechanism for the increase in GR. Naturally-occurring radon gas sourced from uranium and thorium escapes to pores and decays with a 3.8-day half-life. Although alpha-emitting $^{222}$Rn is inert and non-condensable, it is soluble in water and hydrocarbon, and its decay products ($^{214}$Bi and $^{214}$Pb) are gamma-emitting charged particles with half-lives less than 30 minutes. It is hypothesized that these charged particles become associated with water molecules.

In vapor-filled rock, the number of molecules per unit volume is much lower than in liquid-filled rock. In this model, when near-wellbore cooling condenses vapor, the decay products are drawn toward the well and concentrated with the water molecules. The increase in GR occurs because the concentration factor for vapor to liquid-saturated vapor or water usually exceeds 100:1. The term "condensation-induced natural gamma" is introduced here to describe this process.

Open- and Cased-Hole Temperature and Gamma, and Core Gamma Observations

Figure 5:
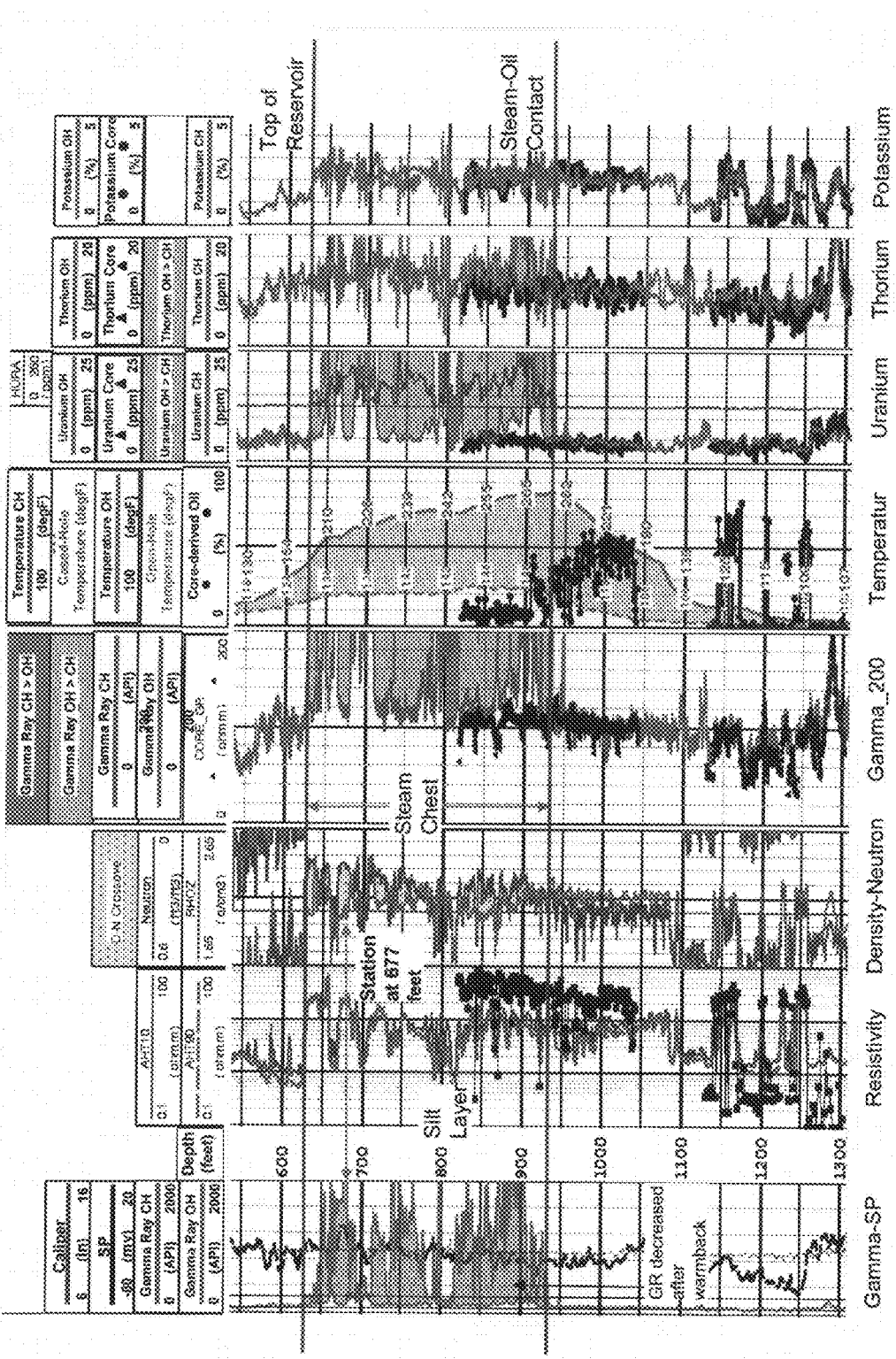
FIG. 5 shows open- and cased-hole logs for a cored well (Well "A") drilled through steam. Elapsed time from open- to cased-hole logs was 6 days. Open- and cased-hole natural gamma spectral data for 10-minute stations at 677 feet are shown in FIG. 7.

FIG. 5 shows open- and cased-hole log and core data for a well (Well "A") drilled through 700 feet of heavy oil reservoir. 350 feet of conventional core was recovered from this interval, including 100 feet of steamed sands and 250 feet of oil reservoir and interbedded shale below the steam-oil contact.

In order to characterize the core GR, total and spectral gamma was measured on the whole core within 72 hours of recovery. Logs including resistivity, density-neutron, temperature and natural gamma spectral (HNGS) were acquired in open-hole. Nine days later, temperature and HNGS were re-logged in the cased-hole.

In the Gamma-SP track, note the GR scale of 0 to 2000 API. Shading in this track highlights intervals of the steam chest where GR decreased by a factor of 20, dropping from 2000 API in open-hole to 100 API (environmentally corrected) in cased-hole. On the Density-Neutron track, separation between the density and neutron is shaded yellow and identifies steam zones. The steam-oil contact is at 925 feet.

Shading in the Temperature track highlights intervals where open-hole temperatures of less than 150° F. increased to between 190° F. and 265° F. on the cased-hole log. Also in this track, core-derived oil saturation increases to 0.50 (v/v) and higher below the steam-oil contact.

The Gamma_200 track uses a typical GR scale of 0 to 200 API to compare core GR (black symbols) with open- and cased-hole GR. Within the steam chest, the large difference between open- and cased-hole GR greatly increased the interest in the result of the whole core GR measurement. Rather unexpectedly, there was no indication of high radioactivity on the core. Instead, core GR agrees with cased-hole GR, except near the steam-oil contact, where the core GR is 100 API—about half the value of the cased-hole GR.

The low level of core GR was an unexpected discovery, because it shifted the focus from an investigation of the reason for the low cased-hole GR to an evaluation of the cause of the high open-hole GR.

Figure 6A:
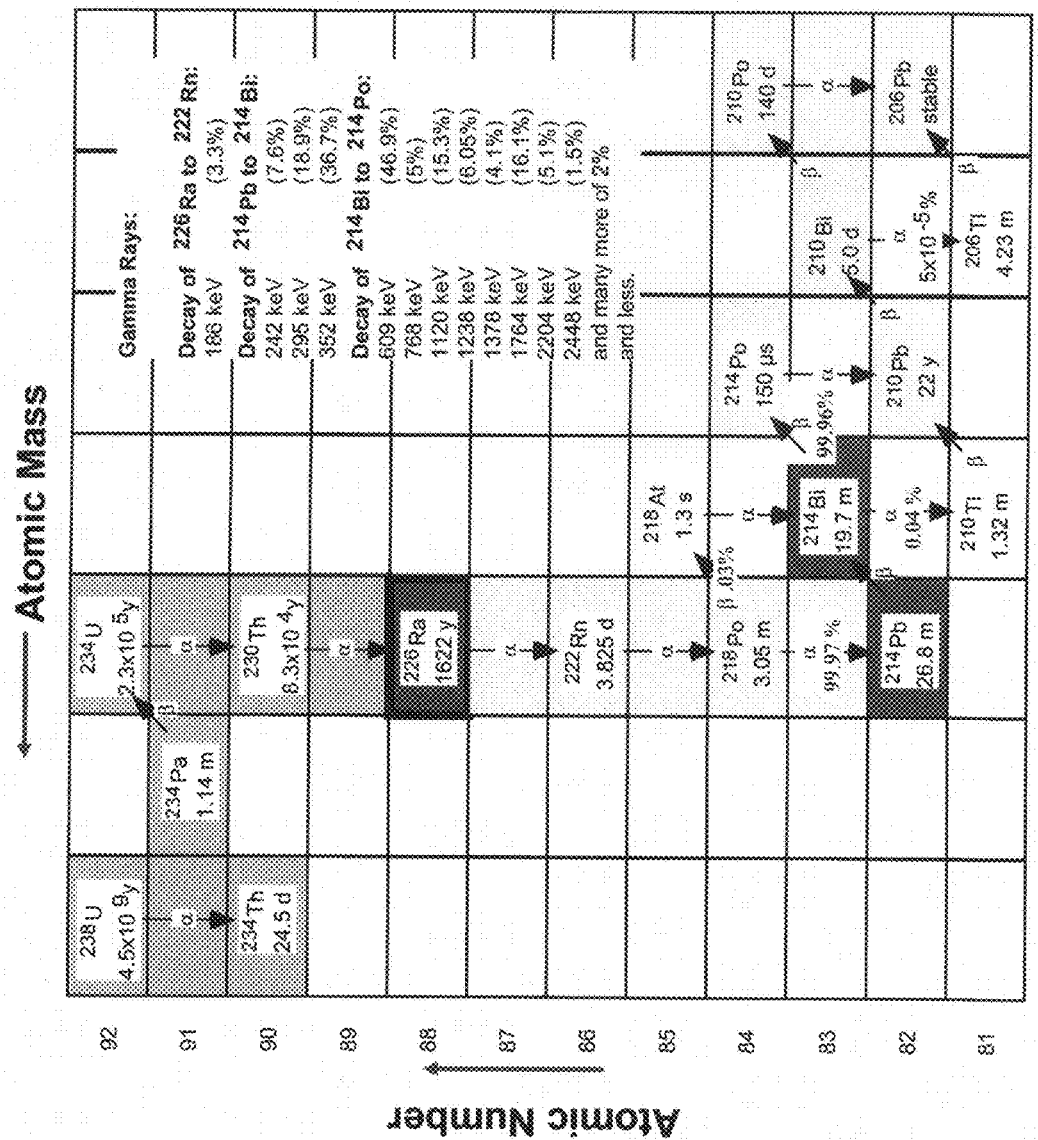
FIG. 6 (6a) Simplified $^{238}$U decay chain with sources and energy levels of gamma rays. $^{222}$Rn undergoes alpha emission with a 3.8-day half-life. Gamma-emitting daughter products $^{214}$Pb and $^{214}$Bi decay with half-lives of less than 30 minutes. (6b) Gamma Rays produced by the decay of $^{238}$U. (6c) Potassium, thorium and uranium response curves for a NaI scintillation detector.

Gamma Ray Origins and Measurement $^{238}$U and its 17 decay products (FIG. 6a) are one of three primary sources of natural gamma radiation. The other sources are $^{232}$Th which has 12 decay products and $^{40}$K which has a single decay to $^{40}$Ar. Not all radioactive disintegrations generate gamma rays. $^{238}$U, for example, decays by alpha-particle ($\alpha$) emission (half-life of $4.5 \times 10^9$ years) to $^{226}$Ra (1622 years) and then to $^{222}$Rn (3.8 days). Radon is a non-condensable inert gas that decays by alpha emission to $^{214}$Pb (27 minutes) and then to $^{214}$Bi (19.7 minutes). $^{214}$Pb and $^{214}$Bi both decay by beta emissions (B) that subsequently generate gamma rays ($\gamma$).

The distinction between alpha and gamma decay has practical significance because alpha radiation cannot penetrate the skin, and is not easily detected downhole. Gamma radiation, on the other hand, can penetrate steel and is relied on for rock type evaluation and correlation in open- and cased-hole.

In routine applications, for total gamma detection, a thallium-doped sodium iodide (NaI) crystal is coupled to a photomultiplier that counts the flashes of light produced by gamma rays. For gamma spectroscopy, the HNGS tool utilizes dual crystal detectors to count gamma rays, and to measure their energy.

Figure 6B:
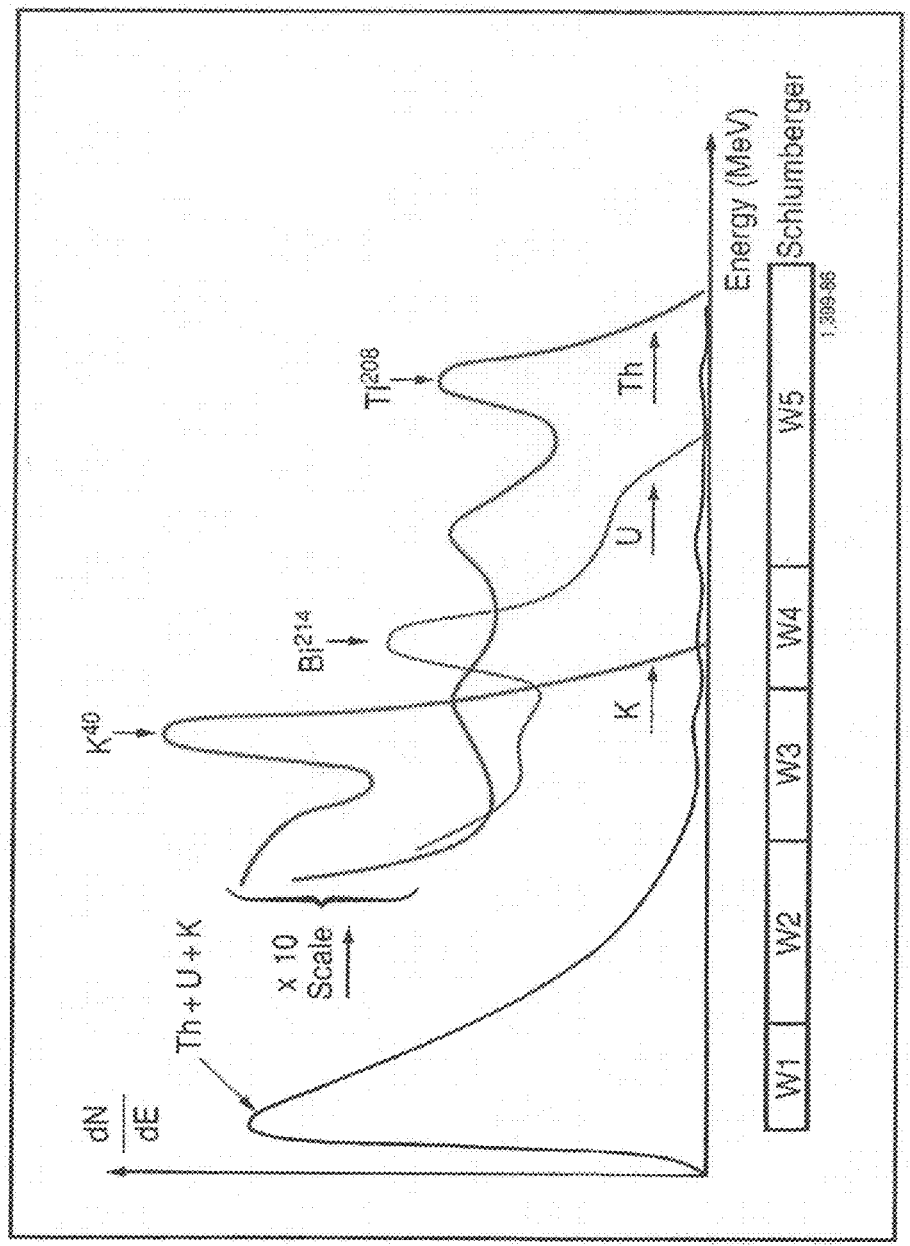

$^{238}$U decay product gamma rays are photons with the quantum energies tabulated in FIG. 3a, and plotted in FIG. 6b. FIG. 6c shows, however, that the gamma ray energies measured downhole are continuous rather than discrete. This is because Compton scattering (gamma rays colliding with electrons) dissipates energy, and because the NaI crystal has limited energy resolution.

The estimation of the concentration of a parent ($^{238}$U, for example) from the concentration of a detectable daughter ($^{214}$Bi) is based on the assumption of secular equilibrium. When a sample is at secular equilibrium, the relative proportions of parent and daughter elements in a decay series remain relatively constant.

Natural Gamma Spectroscopy

Figure 7B:
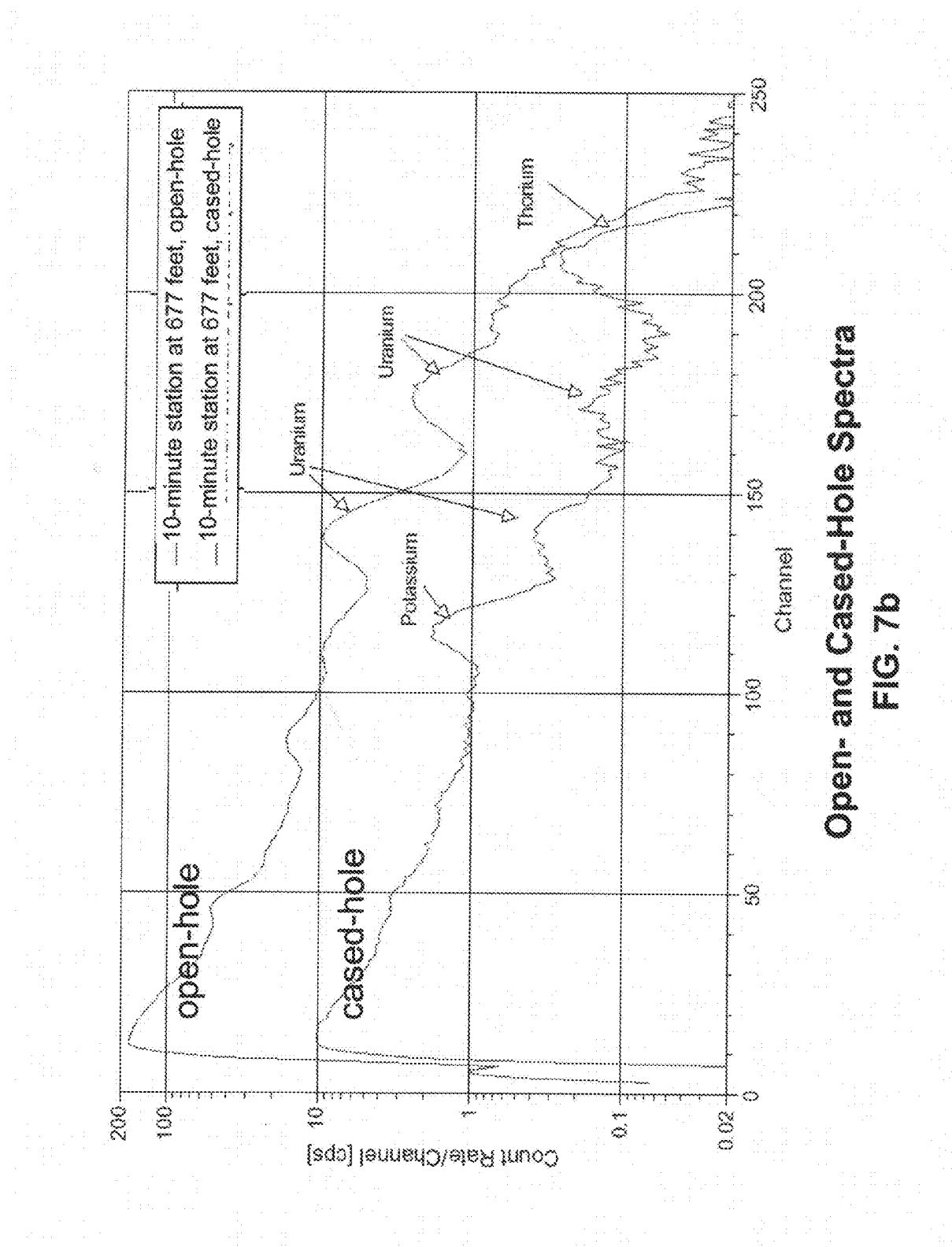

FIGS. 7a and 7b are the open- and cased-hole raw gamma spectra for the cored well in FIG. 5, obtained by recording 10 minute stations within the steam zone at a depth of 677 feet.

The x-axis in FIGS. 7a and 7b is a channel number, which is directly related to energy level. The y-axis shows the number of counts at a particular energy level.

FIG. 7a compares the uranium standard spectrum to the observed open-hole spectrum at 677 feet. The two curves are almost indistinguishable on this plot, indicating that the spectrum from 677 feet is almost entirely due to uranium. Departures from the standard identify small amounts of potassium and thorium.

In FIG. 7b, the open-hole spectrum from 7a is similar to that found in 7a, but the cased-hole spectrum has been severely attenuated. The correction chart (Schlumberger, 2005) indicates that a 10% decrease in total gamma is attributable to the 7-inch casing, but this is not nearly enough to explain the attenuation. Spectral analysis indicates that the lower amplitude of the cased-hole spectrum is almost entirely attributable to a decrease in the uranium component.

More prominent potassium and thorium peaks in FIG. 7b are an artifact of the strong decrease in the uranium peaks that were interfering with and masking the potassium and thorium peaks on the open-hole data.

The decrease in uranium explains why the open-hole GR is close to 2000 API, but the cased-hole GR is only 100 API. The spectral analysis does not explain why the uranium decreased, or where it went, it simply identifies it as the cause of the GR decrease.

Continuous logs of uranium, thorium and potassium, are not as precise as station measurements, but they do provide accurate and useful information about variations of radioactivity with depth. In the uranium, thorium and potassium tracks of FIG. 5 these data show that, within the steam chest, open-hole uranium is high while cased-hole and core-derived uranium values are low. Above and below the steam chest, all three methods are in agreement.

A Mechanism for Increasing Natural Gamma

As noted above, $^{238}$U decays to form $^{222}$Rn a non-condensable inert gas. Radon is important because studies in geothermal reservoirs have found that for steam-filled rock, radon concentration in pores is higher because pore fluid density is lower (D'Amore, 1978). Stated differently, the concentration of radon increases because, compared to water, vapor has fewer molecules per unit volume, and the rate of radon production is the same for both water- and vapor-filled rock.

Experiments on steam-filled rock also indicate that the distribution of radon may change in steam-filled rock. Kazuichi (1982) demonstrated that radon emanating from grains tends to become trapped in pore space by grain-coating water.

Neither of these factors increases the overall gamma radioactivity of the rock, but they do increase the availability of $^{222}$Rn for a unit volume of pore fluid.

Once $^{222}$Rn is in the pore space, it decays by alpha emission to form the gamma-emitters $^{214}$Pb and $^{214}$Bi. This transmutation produces chemically-reactive cations that can associate with water molecules in pore space, and a significant fraction of these charged particles are expected to become concentrated with water molecules when vapor condenses. This is the basic mechanism postulated for condensation-induced natural gamma.

With regard to this process, it should be noted that when $^{222}$Rn, $^{214}$Pb, and $^{214}$Bi become concentrated in condensate, they are no longer in secular equilibrium with uranium. This physical separation via $^{222}$Rn leads to a false signature of uranium on natural gamma spectral logs.

It appears that the radon gas phase is required for the physical separation to work. With this in mind, the absence of a gas phase during the decay of $^{40}$K neatly fits with the fact that the core-, open- and cased-hole derived K concentrations are all in agreement.

The short half-lives of $^{214}$Pb and $^{214}$Bi also influence this process. When condensation ceases, radiation from these sources should decrease to normal levels within a few hours. In a simplified analysis, based only on $^{214}$Pb decay, GR decreases by half every 27 minutes. At this rate, after only two hours, 2000 API would decrease to less than 125 API.

For the cored well, flushing might have removed condensate from the steam zone core. However, if that did not occur, and a high GR had been measured at the wellsite, the low GR measured 72 hours later would have been explained by the decay and lack of replenishment of the short-lived gamma emitters.

Vapor-to-liquid specific volume ($V_g$) is expected to exert the most control on the concentration factor for condensation-induced natural gamma. This ratio is sensitive to vapor temperature, pressure and quality. Steam quality is a measure of the amount of water vapor that coexists with water droplets. At typical reservoir conditions of 40 psia and 267° F., 100% quality, "dry steam" contains only vapor (i.e., no water droplets) and has a $V_g$ of 635. At the same pressure and temperature, V5 for 50% quality steam is 335, and 10% quality steam has a $V_g$ of 68 (ASME, 1967). Rock type and formation temperature will also affect the magnitude of the induced gamma.

Gas separation on the density and neutron logs through steam zones with high gamma indicates that within the 4-to-12 inch depth of investigation (defined as 90% of the integrated radial geometric response) of the density and neutron measurements (Ellis, 1984) liquid condensate occupies only a fraction of the pore space. Apparently, the chilling process produces only a thin annulus of liquid, or perhaps it only produces droplets that are suspended in vapor. The proximity of the condensate to the wellbore, and the concentration of gamma-emitters within the condensate, appears to explain why a small amount of condensate can produce high GR.

Observations of the Rate of GR Decrease

Figure 8:
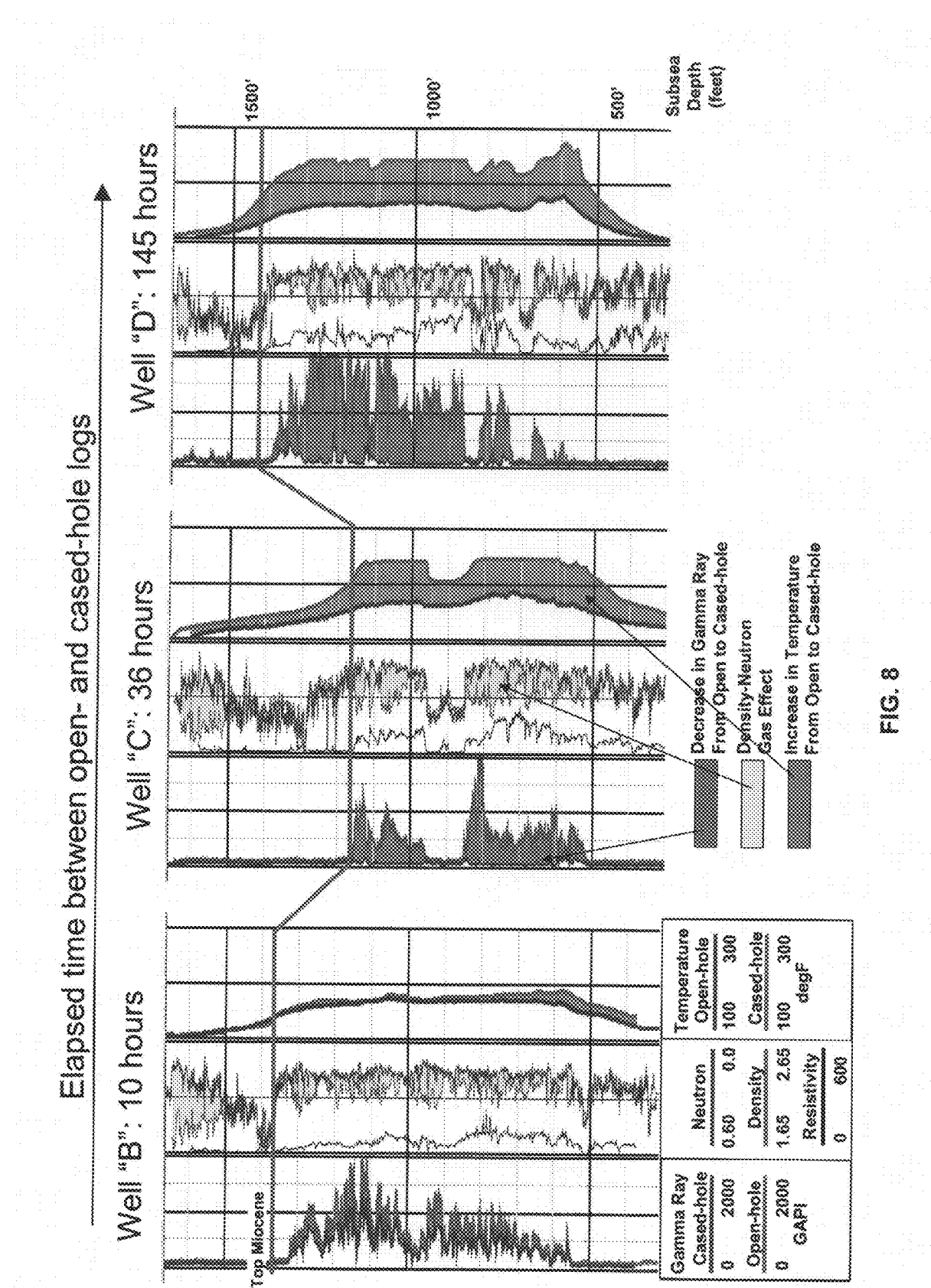
FIG. 8 Open- and cased-hole logs for three wells ("B", "C", and "D") drilled through steam. Elapsed time between open- and cased-hole GR and temperature logs was between 10 and 145 hours. Cased-hole temperature increases, and GR decreases, with elapsed time.

For three closely located new wells ("B", "C" and "D"), cased-hole GR and temperature logs were acquired at elapsed times of 10, 36 and 145 hours after the open-hole logs (FIG. 8). Open-hole temperatures for these wells were less than 150° F. and steam-chest temperatures were expected to be above 260° F. From the cased-hole temperature logs, wells B and C appear to be close to thermal equilibrium, but temperatures below 200° F. indicate that well 1 is still warming-back.

The amount of separation between open- and cased-hole GR in FIG. 8 appears to be related to the difference between open- and cased-hole temperature, and therefore, elapsed time. If the GR decay process is similar in all three wells, then most of the decrease in GR occurs between 10 and 36 hours after open-hole logging. At 10 hours, there was some decrease in GR, but at 36 hours, almost all the high GR in well B has returned to normal levels. If well C had been logged at 36 hours, the GR log might have looked very similar to the log acquired at 145 hours.

Several factors are likely to control the rate of decrease in condensation-induced natural gamma. Radioactive decay rate is one factor. Another is the increase in near-wellbore temperature, which acts to decrease the rate of condensation, and might even act to reverse the condensation process, by flashing liquid back to vapor.

Near-wellbore condensation should cease when the vapor-filled rock adjacent to the well increases to a temperature above the dew point of the vapor. Since reservoir temperature, thermal diffusivity and vapor characteristics vary with depth, the time at which condensation ceases is also expected to vary with depth. The data in FIG. 9 suggest that, for intervals of Well B, condensation has stopped or slowed and half-life decay has begun to dominate at 10 hours.

Design of an Induced-Gamma Experiment

The prediction that condensation-induced natural gamma can be generated by cooling a hot well that intersects a steam chest was tested in a new well (Well "E"). Distributed temperature survey (DTS) fiber optic temperature cable was strapped to the outside of tubing in this well and the tubing was hung inside blank 7-inch casing. The well was filled with water for all cased-hole logs and the tubing was intermittently used to circulate water to cool the well. The DTS provided continuous temperature data at one meter depth intervals of the well, sampled every five minutes.

Figure 9:
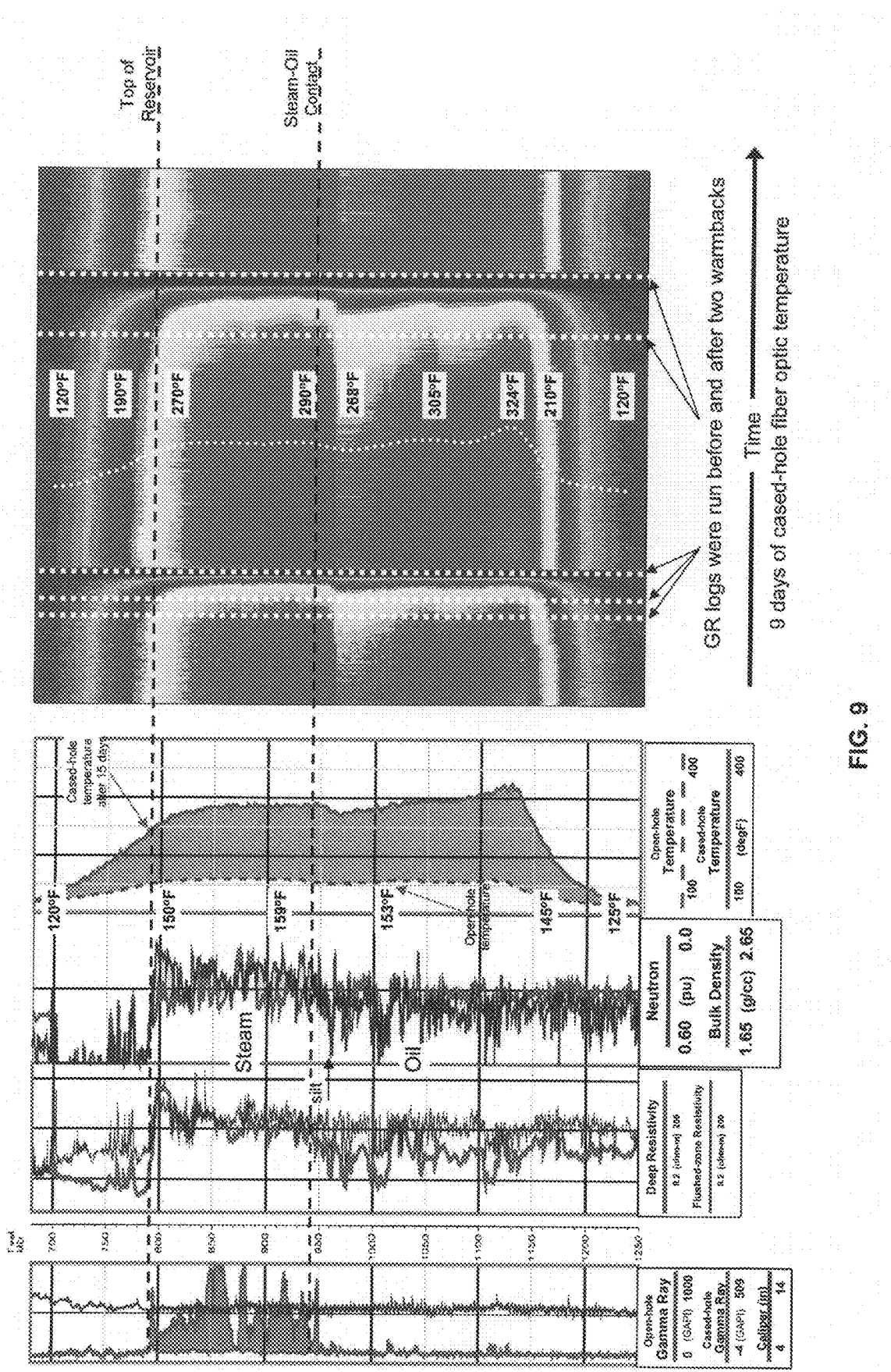
FIG. 9 Open- and cased-hole logs for the well used for warmback experiments (Well "E"). Fiber-optic temperature data (on right) shows temperature after the well stabilized and after the well was cooled by circulating water down tubing and allowed to warmback. Arrow "A" in temperature track identifies cased-hole log acquired after well stabilized for 15 days; "B" identifies open-hole temperature and temperature logs run after the cased-hole was cooled. GR logs were run before and after cooling.

FIG. 9 summarizes the open- and cased-hole gamma and temperature logs, including nine days of DTS data and five through-tubing GR-temperature logs. The first "static" GR-temperature log was recorded 15 days after open-hole logging, when GR had decreased from 2000 to less than 200 API and the maximum temperature was 339° F. Notably, this maximum temperature occurred within the oil zone, and, at static conditions much of the oil zone in this well is hotter than the steam zone. Following the static survey, the well was circulated and allowed to warmback. The process was then repeated.

Figure 10:
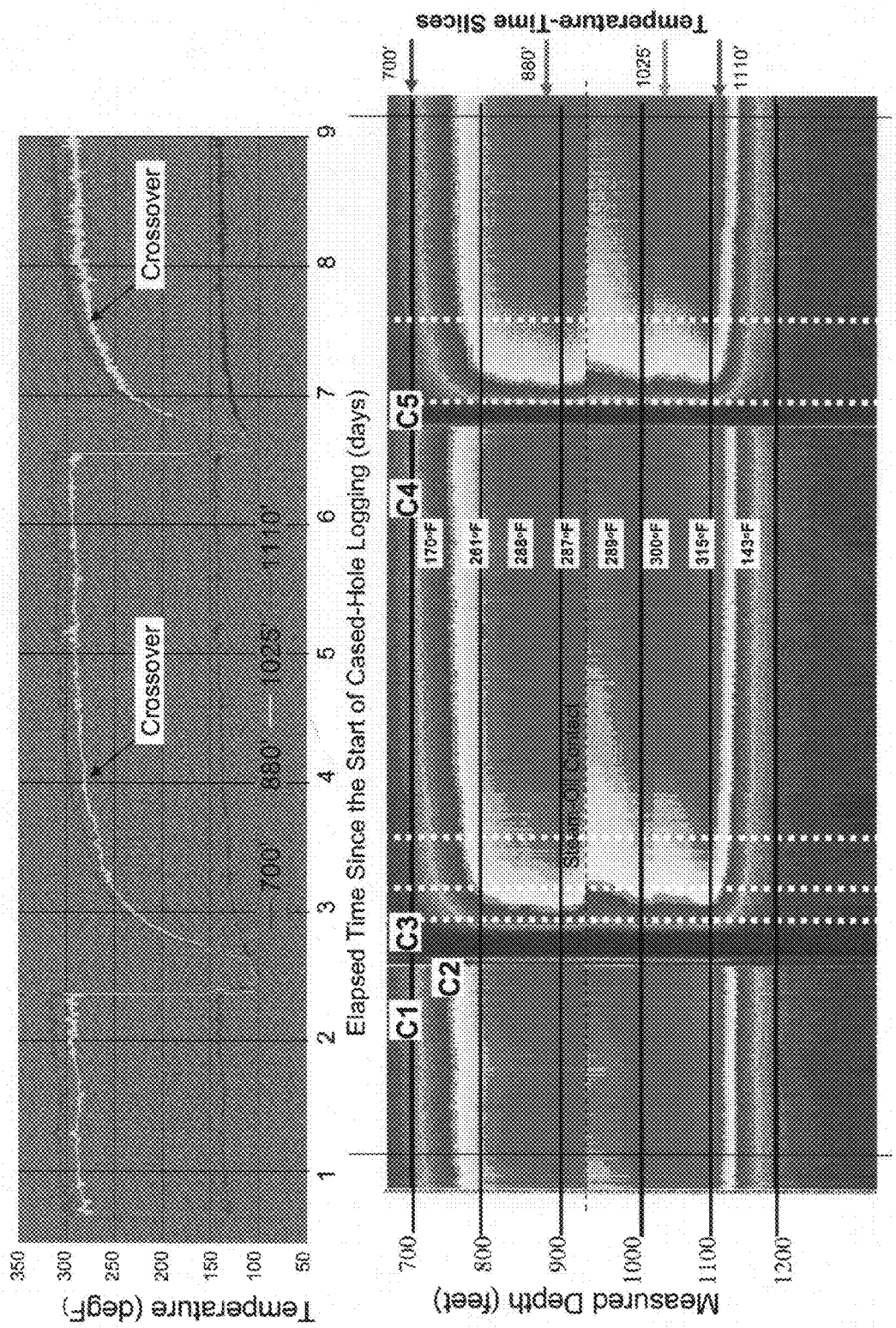
FIG. 10 Nine days of fiber optic temperature (DTS) data, including two circulation and warmback experiments from Well "E". Upper plot shows temperature-history profiles at depths of 700, 880 (steam), 1025 (oil) and 1110 feet. Oil-filled rock appears to warmback more slowly than steam-filled rock. At the "crossover" point, the temperature of the (hotter) oil-filled rock finally overtakes the steam-filled rock. GR logs C1 through C5 are shown in FIG. 12.

At the top of FIG. 10, temperature-time slices at four depths provide quantitative data on temperature history. For both the first and second warmbacks, comparison of two of these traces, from the steam zone at 880 feet, and from the oil zone at 1025 feet, shows that beyond the "crossover" point, the temperature in the oil zone is higher than that in the steam zone. Even though the oil zone is hotter, temperature in the steam zone initially increases faster. This observation is consistent with data that show that steam-filled rock has higher thermal diffusivity than oil-filled rock (Prats, 1982).

Five through-tubing GR-temperature surveys are identified in FIG. 10 as "C1" through "C5". Logs C1 and C4 were acquired at static conditions, after the well had stabilized for at least three days. Logs C2, C3 and C5 are warmback logs acquired after cooling the well for up to five hours.

Results of the Induced-Gamma Test

Figure 11:
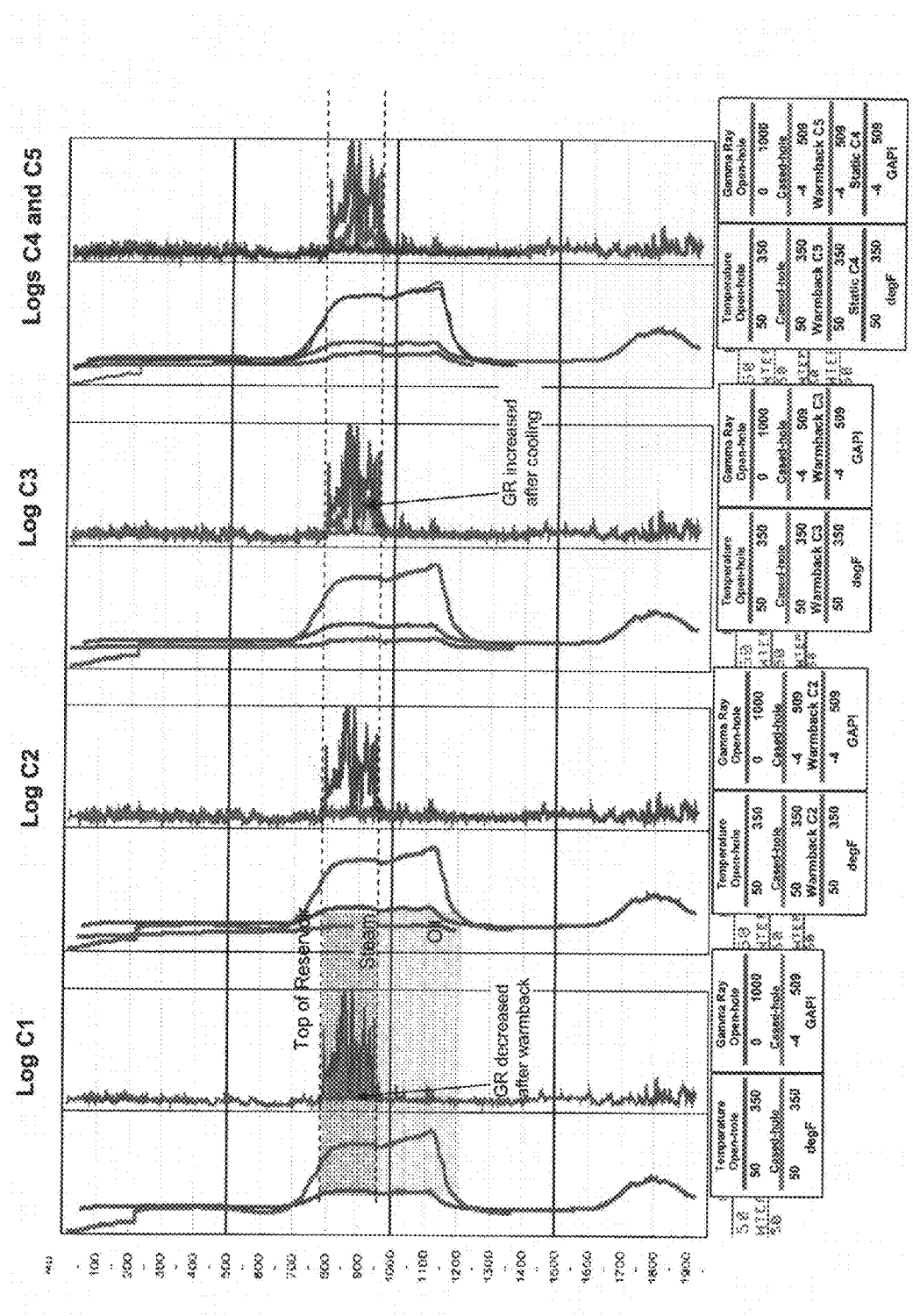
FIG. 11 Temperature and GR logs C1 through C5, as identified in FIG. 10.
Figure 12:
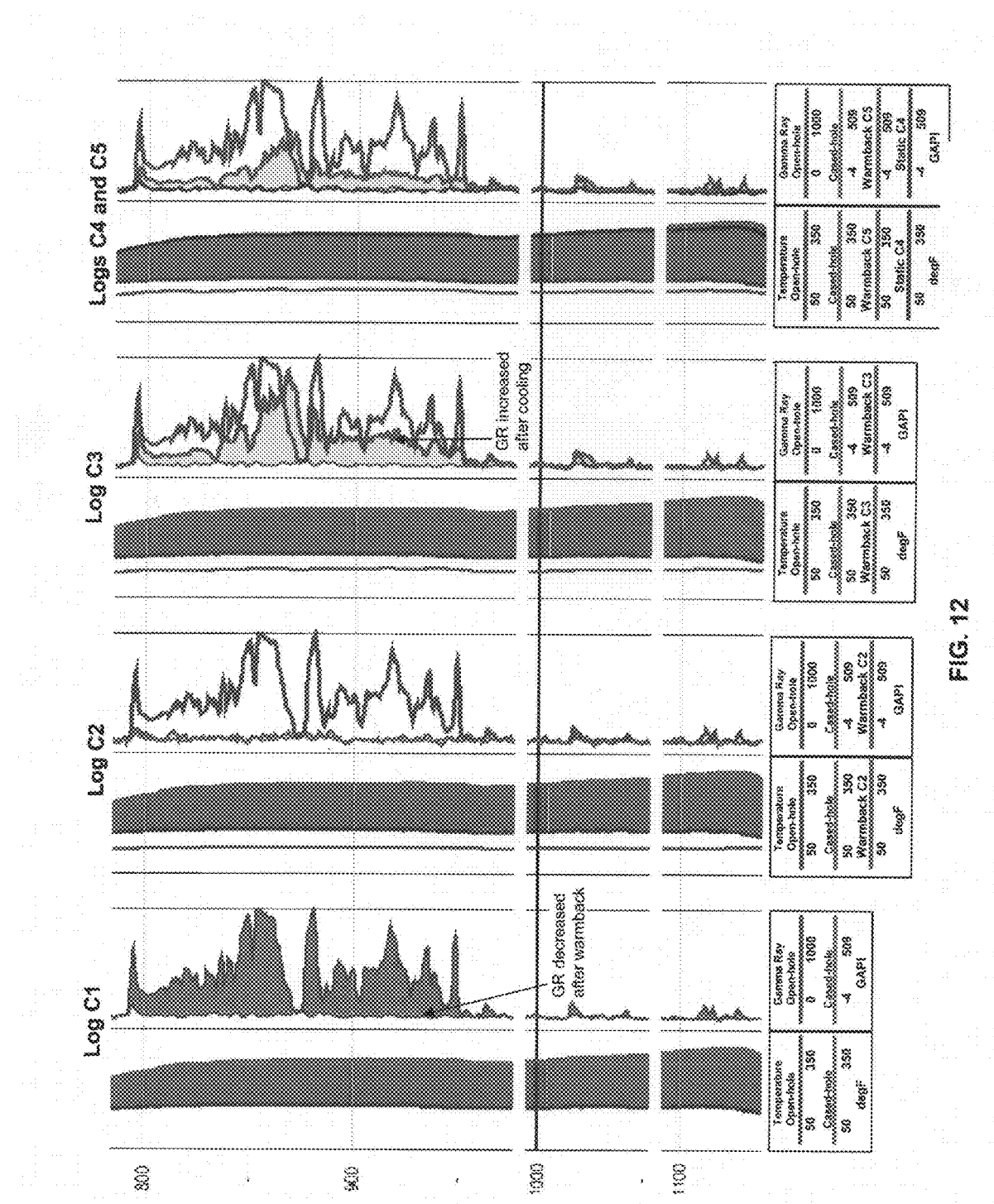
FIG. 12 Detailed view of GR and temperature data from FIG. 11.

FIG. 11 compares cased-hole logs C1 through C5 to the open-hole logs, and FIG. 12 is an expanded view of steam-affected intervals of FIG. 11.

A crossplot of the C1 and open-hole GR for intervals with cased-hole temperatures below 140° F. was used to do a downhole normalization of the through-tubing, through-casing GR to the open-hole GR. From this analysis, the open-hole GR scale of 0 to 1000 API is equivalent to a through-tubing GR scale of −4 to 509 AN.

The open- and cased-hole temperature and gamma data from log C1 is repeated in the displays for logs C2 through C5. In log C2, after circulating cool water for 45 minutes, temperature dropped below 120° F., but there was very little change in GR.

After five additional hours of cooling, FIG. 12 shows that GR on log C3 increased through the steam zone and is similar to the open-hole GR. A significant difference occurs at 875 feet, where the highest GR value on C3 occurs in low-resistivity silt (see FIG. 9).

Prior to the second circulation and warmback, log C4 provided static temperature and GR after three days of warmback. Log C4 confirmed that temperature and OR had returned to conditions similar to those at the start of the first warmback.

After the second circulation of 3.5 hours, the GR from log C5 shows an increase that is similar to, but less than, log C3. The five hour duration of the C3 circulation may account for this difference.

For two intervals within the oil zone, below 1000 feet, and below 1100 feet (FIG. 12), a relatively small amount of induced gamma appears to occur on the open-hole log. In log C3, and again in log C5, the interval below 1000 feet shows an increase in GR after circulation. There was no change for the interval below 1100 feet. The high temperatures through the oil zone suggest impending steam breakthrough at these depths. The interval below 1100 feet may not show induced view gamma because steam injection was temporarily off while drilling and logging this well.

CONCLUSIONS

Open-hole GR through steam zones of new wells with relatively cool boreholes is usually higher than 500 API. For the same intervals, cased-hole GR decreases to about 100 API after the well reaches thermal equilibrium.

When the cased-hole GR is acquired within hours of the open-hole GR, while the well is still cool, the high GR on the open-hole log repeats.

Condensation-induced natural gamma provides a mechanism for generating high GR in cooled steam-zones. According to this theory, high GR occurs when radon decay products ($^{214}$Pb and $^{214}$Bi) become concentrated with steam or another condensable gas as a result of near-wellbore cooling.

When gamma-emitting $^{214}$Pb and $^{214}$Bi become concentrated in vapor, they are no longer in secular equilibrium with uranium. The physical separation of $^{214}$Pb and $^{214}$Bi from uranium leads to a false signature of uranium on natural gamma spectral logs.

$^{214}$Pb and $^{214}$Bi have half-lives of 30 minutes or less. When condensation stops, they are no longer replenished, and radiation from these sources should decrease to normal levels within a few hours.

The condensation-induced natural gamma mechanism was tested by circulating cool water through a hot, thermally-stabilized well. GR increased by a factor of ten after five hours of circulation, and returned to low levels when the well warmed-back. A second cycle of cooling caused GR to increase again.

The magnitude of condensation-induced natural gamma is expected to depend on vapor temperature, pressure and quality, as well as rock type and the amount of cooling. The fraction of vapor in the steam zone (steam quality) is likely to be the most important of these factors.

Condensation-induced natural gamma should be an early indicator of steam breakthrough.

Condensation-induced natural gamma provides a method for the detection and characterization of condensable gases, both downhole and at surface.

REFERENCES

The following references are cited herein. The entire disclosure of each reference is relied upon and incorporated by reference herein.

U.S. Pat. No. 2,197,453
U.S. Pat. No. 2,385,378
Russian Patent No. RU2079650 C1
U.S. Pat. No. 4,221,482
U.S. Pat. No. 4,495,142
U.S. Pat. No. 5,501,099
Abdeen and Khalil, "Origin of NORM in Ras Budran Oil Field", SPE 29795, (1995).
*Steam Tables*, 17th printing, ASME, Windsor, Conn., (1967).
D'Amore, F., Sabroux, J. C., and Zettwoog, P., "Determination of Characteristics of Steam Reservoirs by Radon-222 Measurements in Geothermal Fluids", *Paleoph*, (1978) v. 117, 253-261.
Ellis, D. V., *Well Logging For Earth Scientists*, Elsevier, N.Y. (1984), 269-280.
Ellis, D. V., Perchonok, R. A., Scott, H. D., and Stoller, C., "Adapting Wireline Logging Tools for Environmental Logging Applications", paper C, presented at the 1995 SPWLA Annual Logging Symposium, (1995).
Kazuichi S., "Radon Emanation From Finely Ground Rocks", SGP-TR-63, Stanford Geothermal Project Report, October, 1982.
Prats, M., *Thermal Recovery*, Monograph Series, SPE, Richardson, Tex. (1982), 7, 201-238.
Semprini, L. and Kruger, P., "Radon Transect Analysis in Geothermal Reservoirs", SPE 8890, (1980).
Schlumberger, "Log Interpretation Principles and Applications", New York (1985), section 3-7.
Warren, (G. J. and Kruger, P., "Radon Transients in Vapor-dominated Geothermal Reservoirs", SPE 8000, (1979).

I claim:

1. A method for locating subsurface structures that are filled with condensable vapors, comprising the steps of:
    measuring a property of a formation in the ground;
    causing condensation to occur in the formation;
    measuring change in the property as a result of condensation occurring in the formation;
    evaluating the property of the formation based on the measured change therein; and determining the location of subsurface structures that are filled with condensable vapors after evaluating the property of the formation.

2. The method set forth in claim 1, wherein the property of the formation is radioactivity.

3. The method set forth in claim 1, wherein the step of measuring a property comprises measuring gamma radiation in the formation.

4. The method set forth in claim 1, wherein the formation is a subsurface formation adjacent an oil well in the ground.

5. The method set forth in claim 1, wherein the step of measuring a property comprises measuring gamma radiation of the formation following filling the formation with vapor, the step of causing condensation comprises condensing the vapor, and the step of measuring change in the property comprises measuring change in gamma radiation of the formation as a result of condensing the vapor.

6. The method set forth in claim 5, wherein the step of causing condensation comprises introducing cold water into the formation.

7. The method set forth in claim 1, wherein the condensable vapors comprise steam and other condensable gases such as natural gas liquids, and the condensable vapors result from cooling and/or changes in pressure.

8. A method for locating subsurface structures that are filled with condensable vapors, comprising the steps of:
    logging gamma radiation in a well to define a background radiation response;
    chilling the well by pumping cool water into the well, to cause vapor surrounding the well to form condensate;
    logging gamma radiation in the well to define a new radiation response;
    comparing the new radiation response to the background radiation response to identify vapor zones where the radiation increased; and determining the location of subsurface structures that are filled with condensable vapors after comparing the new radiation response to the background radiation response.

9. The method set forth in claim 8, wherein the condensable vapors comprise steam and other condensable gases such as natural gas liquids, wherein the condensate is formed by cooling the condensable vapors.

* * * * *